Patented Nov. 5, 1929

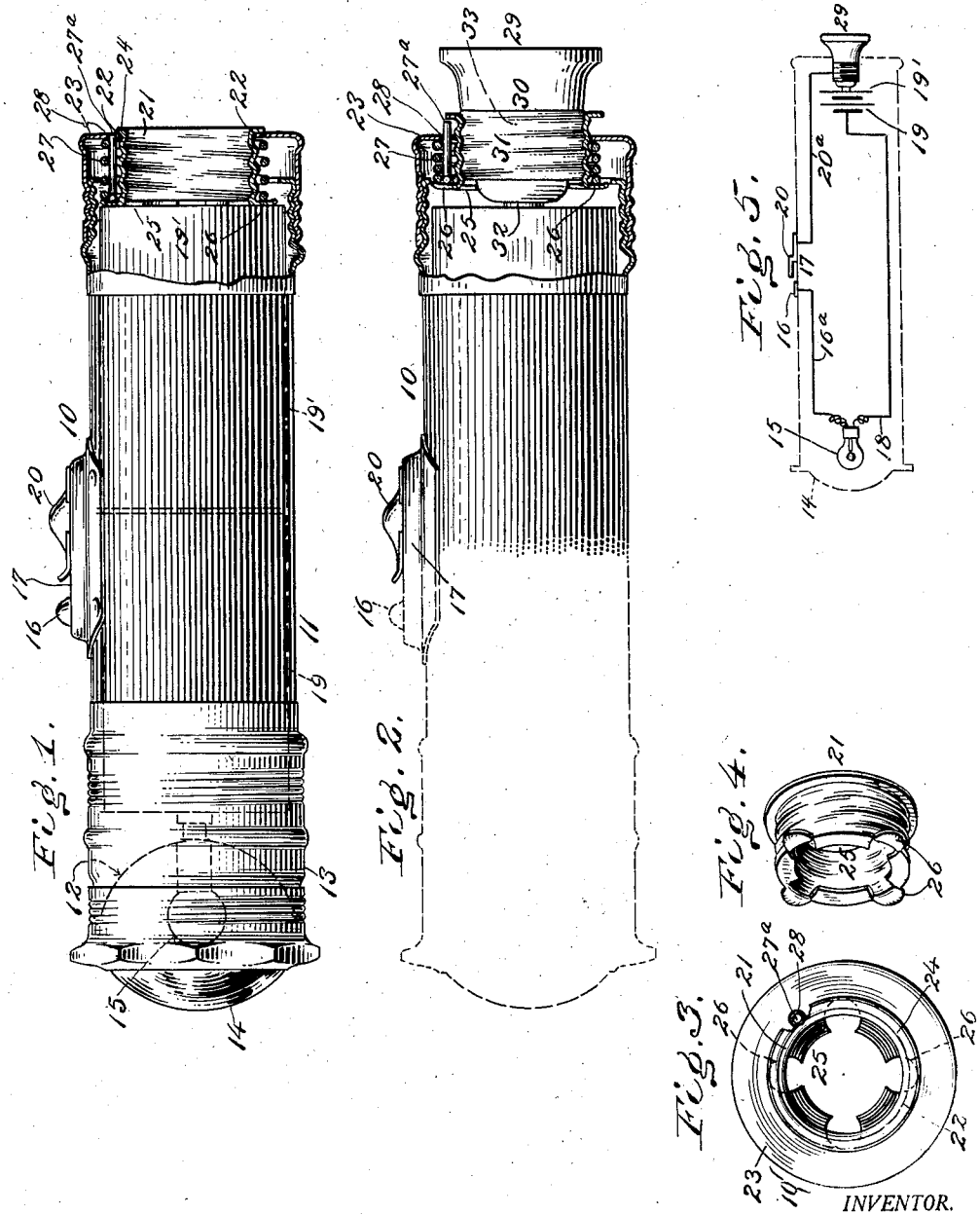

1,734,230

UNITED STATES PATENT OFFICE

NATHANIEL ROE, OF PATCHOGUE, NEW YORK

COMBINED SEARCHLIGHT AND FUSE TESTER

Application filed January 27, 1928. Serial No. 249,969.

My invention relates to improvements in means for testing electric fuse plugs and other devices, and the same has for its object to provide a simple, efficient, and reliable portable device for ascertaining the operativeness of a fuse plug or other device used in electric circuit systems.

Further, said invention has for its object to provide a testing device which may be readily applied to or formed as a part of a portable electric flash-light.

Further, said invention has for its object to provide a device of the character specified which may be applied to a portable electric search-light, and brought into circuit with the electric battery normally utilized to illuminate the lamp, in order to determine whether or not the device tested is operative or not.

Further, said invention has for its object to provide a device of the character specified which may be applied to the cap or cover used to close the casing of an electric flash-light, in order to cause the current from one terminal of the battery to be conducted therethrough to the casing forming part of the circuit for illuminating the lamp, and to permit of the introduction of a fuse plug or other device whereby to break the normal circuit including the lamp and battery and thereby cause the current, when the circuit closer is operated, to complete said circuit through said fuse plug or device.

Further, said invention has for its object to provide a device of the character specified in which the cover for closing the battery casing is provided with a screw-threaded sleeve, adapted to receive a fuse plug or other device, which sleeve is movably secured within said cover and provided with means for yieldingly maintaining said threaded sleeve in electrical contact with one terminal or part of the battery.

Further objects will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings showing an illustrative embodiment of the invention—

Figure 1 is a side elevation, partly broken away and in section, illustrating one form of combined flash-light and fuse tester constructed according to, and embodying my said invention;

Fig. 2 is a similar view showing a fuse-plug applied thereto for the purpose of test;

Fig. 3 is an end view of the cap and fuse holding member;

Fig. 4 is a detail perspective view of the fuse holding member, and

Fig. 5 is a diagram of the circuit connections.

In said drawings, 10 designates a portable electric flash-light illustrating a common or well-known type of flash-light, and comprising a cylindrical casing 11 provided at one end with a reflector 12, and a cover 13 having a lens 14 therein. The reflector 12 is provided with a suitable lamp socket in which is secured an incandescent lamp 15. One terminal of said lamp 15 is in electric connection with one terminal 16 of a circuit closer 17 secured upon the outer side of the cylindrical casing 11, and the other terminal of said lamp is in direct contact with the center terminal 18 of the battery 19 of the two batteries 19, 19′, which are connected in series. The outer wall of the battery 19′, which constitutes the other terminal thereof, is in electrical communication with the other terminal 20 of the circuit closer 17 through a threaded sleeve member 21 which is movably disposed within an opening 22 provided in the screw-threaded cap or cover 23 which normally serves to seal the casing 11 and maintain the batteries 19, 19′ duly positioned therein.

The sleeve member 21 is made of copper, brass, or other suitable conducting material, and is provided at its outer end with a laterally extending peripheral flange 24, adapted to engage with the outer side of the cap or cover 23. The sleeve member 21 is provided at its inner end with an opening 25, and outwardly extending radial ears 26 which are stamped out or otherwise suitably secured to the inner end of a helical spring 27 serving to maintain the inner end of said sleeve member normally in engagement and electrical connection with the bottom wall of the battery 19'. The sleeve member 21 is provided with a pin 27ᵃ which is secured at one end adjacent to the inner end of said sleeve, and has its outer or free end extending loosely through an aperture 28 in said cap or cover 23 whereby to prevent rotary movement of said sleeve relative to said cap or cover.

29 denotes a fuse-plug of well-known construction comprising a body portion 30 formed of insulating material having a threaded metal portion 31 upon its side, forming one terminal or contact, and a central terminal or contact 32 extending beyond its inner end or base. The terminals 31, 32 are connected within the plug by a fusible section 33.

The operation of the device is as follows:

When the device is used as a flash-light only, the fuse plug 29 is not inserted within the cover 23. The current will then pass from the terminal 18 of the battery 19 to one terminal of the lamp 15, and from the outer terminal of the battery 19' through the sleeve 21, cover 23, conductor 20ᵃ to the terminal 20 of the circuit closer 17, and from the terminal 16 of said circuit to the conductor 16ᵃ to the other terminal of the lamp 15, and complete the circuit when the circuit closer 17 is operated.

When, for example, the device is to be used for the purpose of testing a fuse-plug of an electric lighting or other system in order to determine whether the plug is operative or not, it merely becomes necessary to screw the plug 29 into the sleeve member 21 and bring the contact 32 thereof into engagement with the base of the battery 19'. Hereupon the plug 29 is rotated a turn or so more whereby the sleeve member 21 will be retracted outwardly, and the inner end thereof withdrawn from its engagement with the bottom of the battery 19' and the circuit connection at that point broken. If the plug 29 is perfect or operative and the circuit closer 17 is now operated, the current from the outer terminal or base of the battery 19' will pass through the plug 29, viz via contact 32, fusible section 13, and contact 31 to the cover or cap 23, and thence to the circuit closer 17. The remainder of the circuit will be as hereinabove described. If, on the other hand, the plug is defective, or its fusible section 33 destroyed, the circuit connections from the battery to the lamp will be broken, and in consequence thereof the circuit closer 17 will be inoperative to complete the circuit at that point, and the failure of the lamp 15 to glow will indicate that the plug is defective or useless.

It will of course be obvious that the invention is not limited to the testing of fuse plugs, but that any device which may be fitted into the sleeve member 21 may be tested, in the manner above described.

Having thus described my said invention, what I claim and desire to secure by Letters Patent is:

1. A combined flash-light and fuse tester, comprising a casing, an electric lamp, a circuit closer, a circuit including said casing, lamp and circuit closer, a member movably mounted in said casing, means for maintaining said member normally in electric contact with said source of electric energy; said member being adapted to receive a device to be tested, said device having a part adapted to engage with said source of electric energy and to move said member out of engagement with said source of electric energy whereby to cause current to pass from said source of electric energy through said device to said casing, substantially as specified.

2. A combined flash-light and fuse tester, comprising a casing, an electric lamp, a circuit closer, a circuit including said casing, lamp and circuit closer, a sleeve member normally mounted in said casing, spring means for maintaining said sleeve member normally in electric contact with said source of electric energy; said member being adapted to receive a device to be tested having a part adapted to engage with said source of electric energy and to retract said sleeve member from engagement with said source of electric energy whereby to cause current to pass from said source of electric energy through said device to said casing, substantially as specified.

3. A combined flash-light and fuse tester, comprising a casing, a closure therefor having an opening therein, an electric lamp, a circuit closer, a battery, a circuit including said casing, lamp, and circuit closer, a threaded sleeve normally mounted in the opening of said closure, spring means serving to maintain said sleeve normally in electric engagement with said battery; said sleeve being adapted to receive a fuse plug having a part adapted to engage electrically with said battery, and to move said sleeve out of engagement with said battery whereby to cause current to pass from said battery through said fuse to said casing, substantially as specified.

4. A combined flash-light and fuse tester, comprising a casing, a closure therefor having an opening therein, an electric lamp, a circuit closer, a battery, a circuit including said casing, lamp, and circuit closer, a threaded sleeve normally mounted in the opening of said closure, a spring surrounding said sleeve and serving to maintain the same normally projected and in electric engagement with said battery; said sleeve being adapted to receive a fuse plug having a part adapted to engage electrically with said battery, and to move said sleeve out of engagement with said battery whereby to break the electric connection at said point and to cause current to pass from said battery through said fuse to said casing, substantially as specified.

5. A combined flash-light and tester comprising a casing, an electric lamp, a circuit closer, a battery adapted to have one of its terminals engage a terminal of said lamp, an electric connection between the other terminal of said lamp and said circuit closer, a body carried by said casing, an electric connection between said circuit closer and said body, means carried by said body to receive and hold the device to be tested, and means continuously tending to cause contact between said first mentioned means and the other terminal of said battery thereby normally to maintain the circuit closed between said circuit closer and said battery, said first mentioned means having provision to cooperate with the device to be tested whereby upon introduction of said device to said first mentioned means relative motion between said first mentioned means and said battery will occur to effect a disengagement between said battery and said first mentioned means for the purpose described.

Signed at the city of New York, in the county and State of New York, this 19th day of January, one thousand nine hundred and twenty-eight.

NATHANIEL ROE.